Aug. 12, 1952     H. V. HANSEN     2,606,690
METHOD OF DISPENSING LIQUIDS AND APPARATUS THEREFOR
Filed Jan. 29, 1947     4 Sheets-Sheet 1
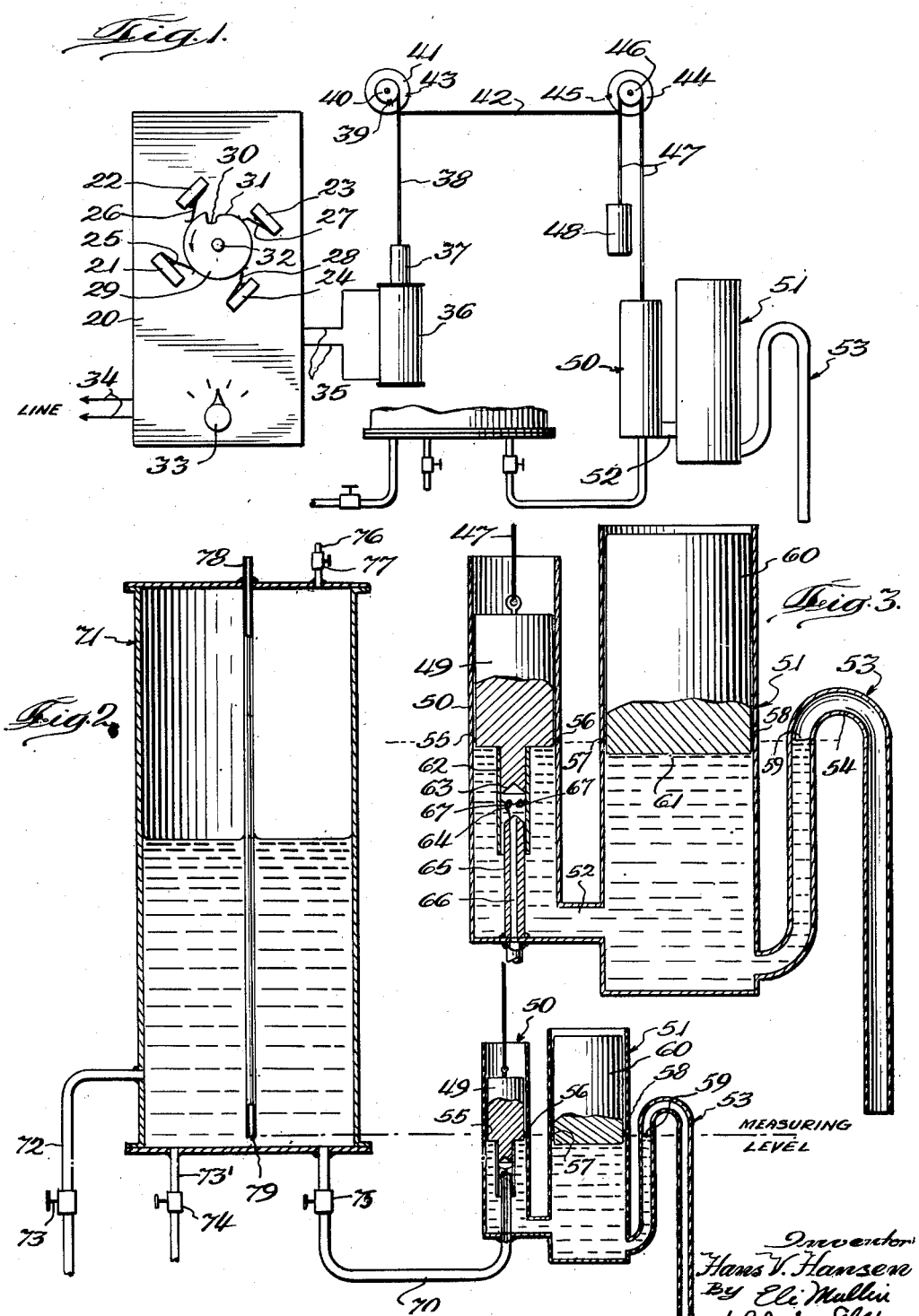

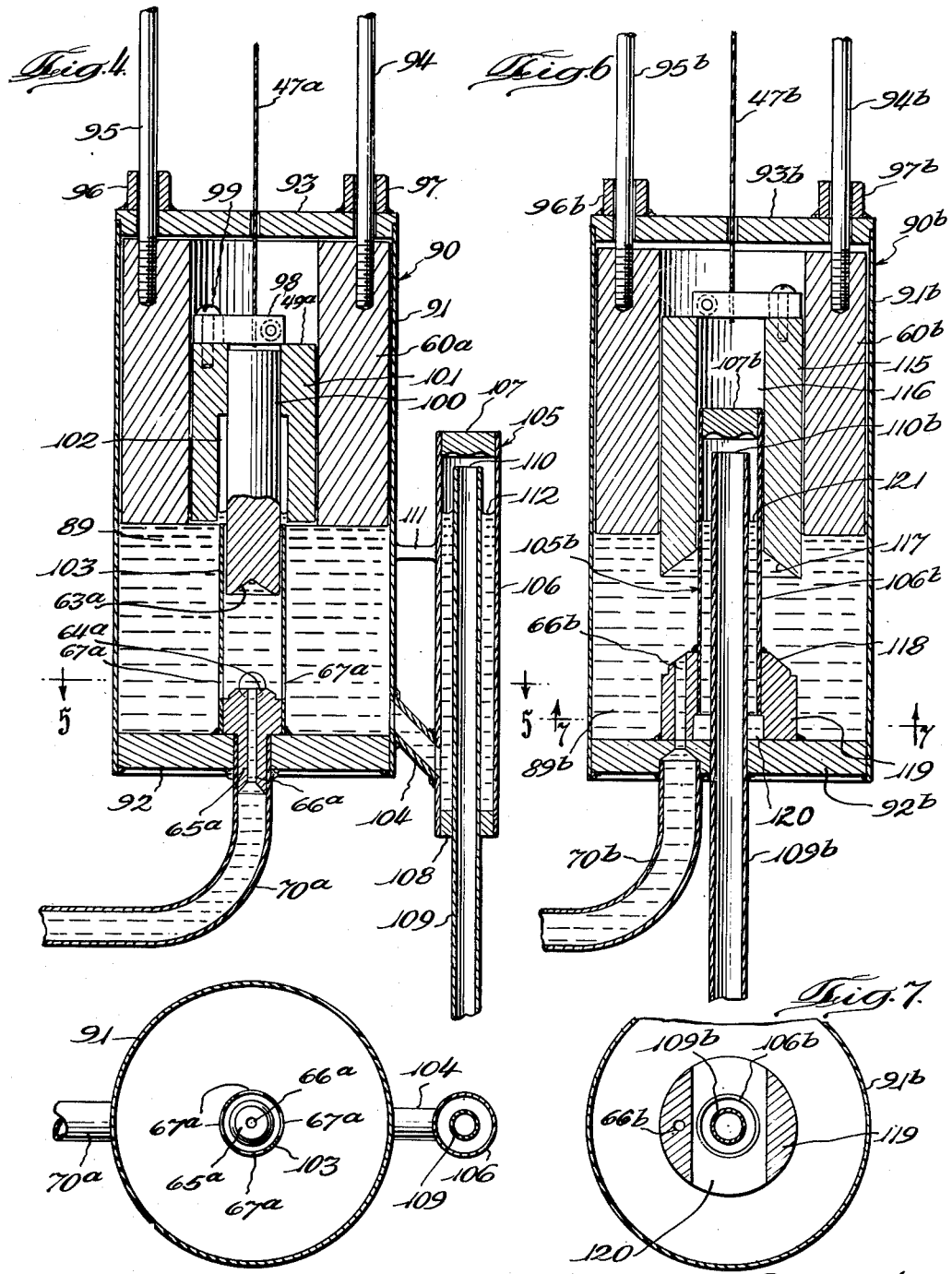

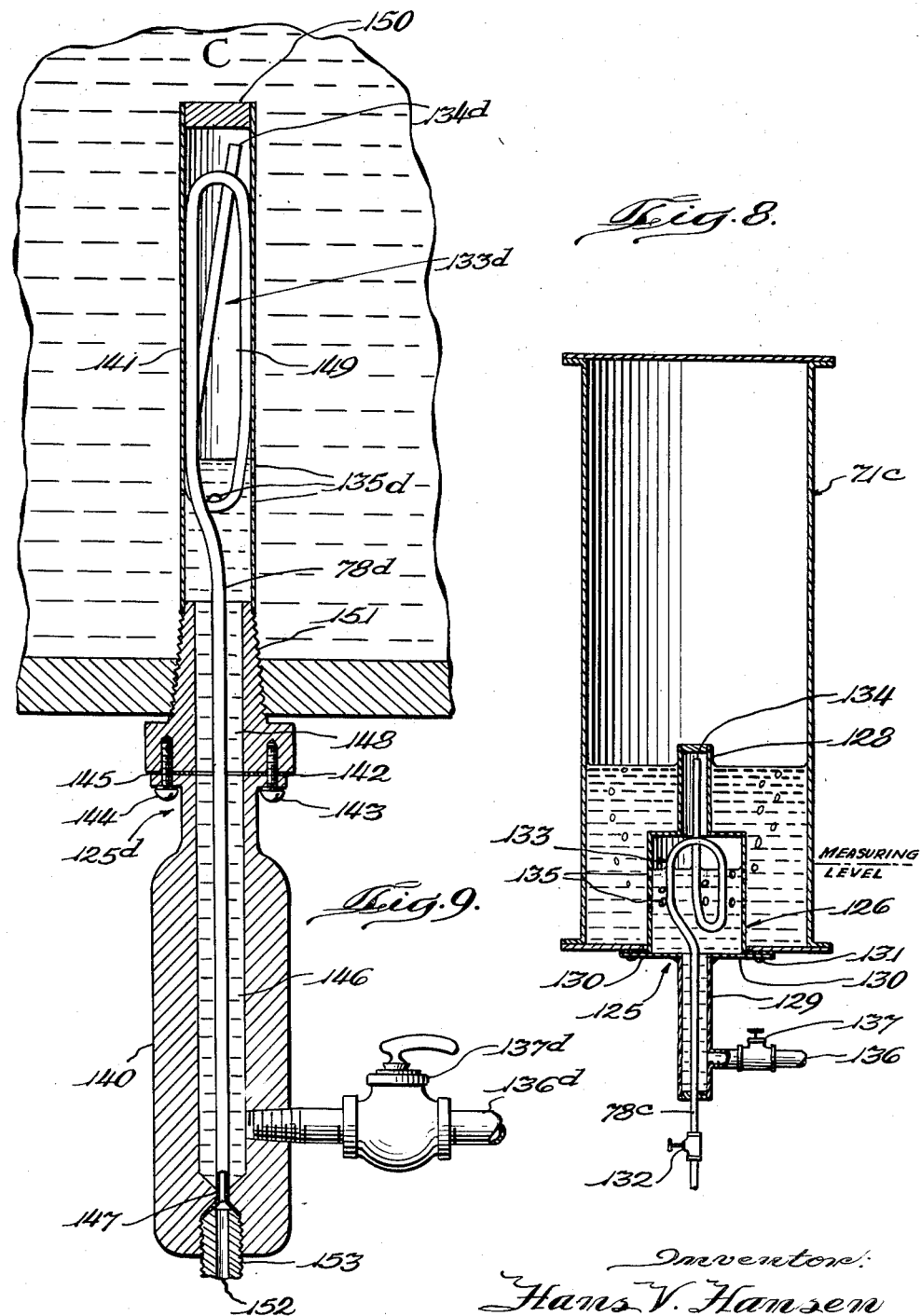

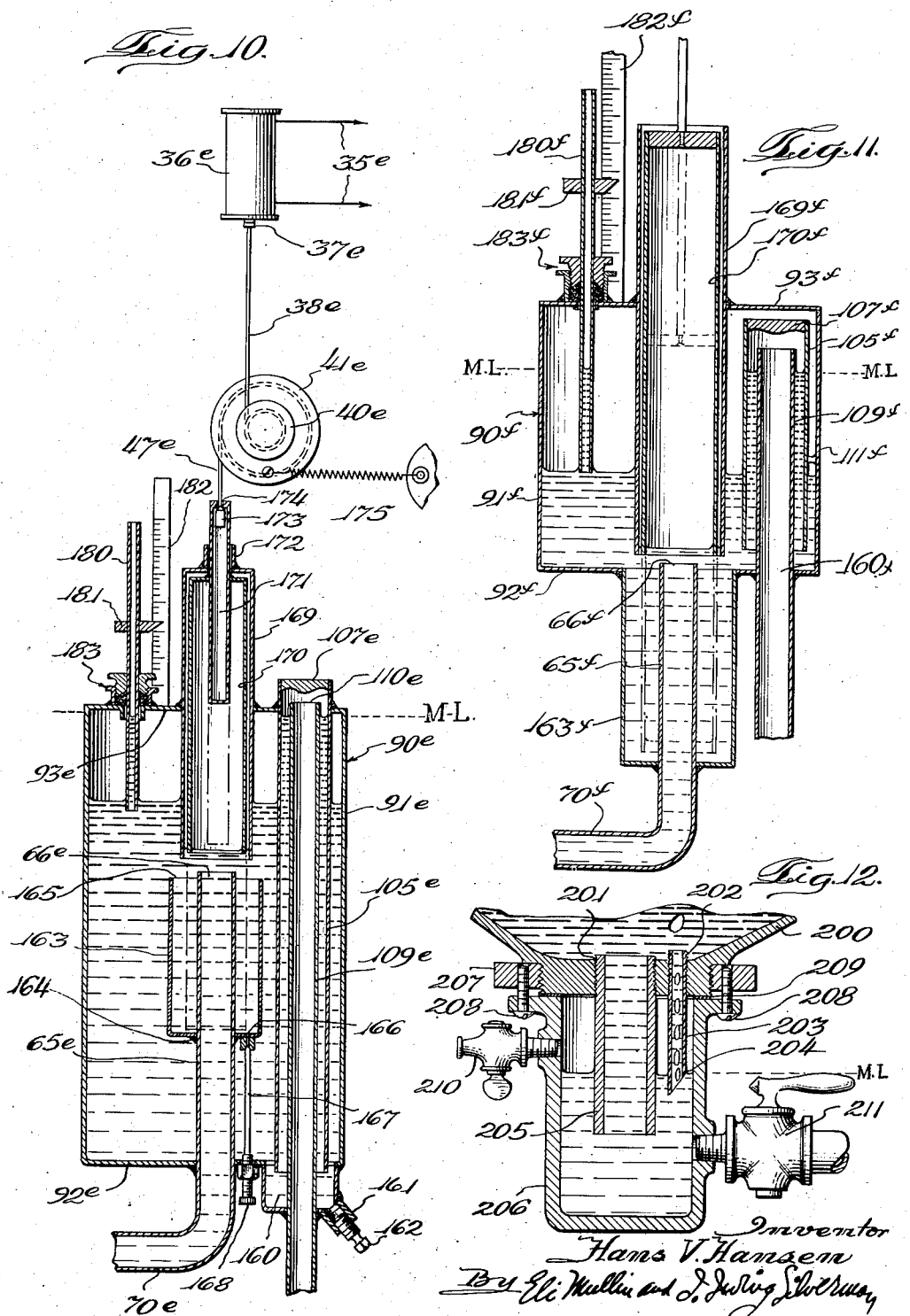

Patented Aug. 12, 1952

2,606,690

UNITED STATES PATENT OFFICE 2,606,690

METHOD OF DISPENSING LIQUIDS AND APPARATUS THEREFOR

Hans V. Hansen, Chicago, Ill.

Application January 29, 1947, Serial No. 725,046

21 Claims. (Cl. 222—1)

This invention relates to a method of dispensing a measured quantity or dosage of a liquid and to apparatus for practicing such improved method. More particularly the invention relates to a method whereby a given quantity of a liquid (such as a fumigant or the like) is withdrawn from a storage tank, and is subsequently dispensed in any desired manner, said withdrawal occurring periodically and automatically if so desired.

As the description proceeds it will be apparent that the invention is not limited to the dispensing of fumigants but can readily dispense a large variety of fluids such as liquid water treatment chemicals, soft drinks, cream, water, etc. Thus it will readily be seen that the application of the invention is indeed vast in scope.

The primary objects of the invention are to provide a novel improved method and apparatus for practicing said method, as set forth above, wherein the dosage of liquid may be predetermined and will remain substantially constant regardless of changes in atmospheric pressure and temperature; wherein insofar as the efficiency and accuracy of the method and apparatus are concerned the nature of the liquid is substantially immaterial; wherein the power requirements for operation of the apparatus are nominal; wherein the entire process may be automatic and the apparatus may be entirely unattended; wherein the process is extremely simple and easily practiced; wherein the apparatus is readily constructed of simple standard members, hence inexpensive to manufacture; and wherein many advantages over previous attempts to produce methods and apparatus for dispensing liquids will be attained.

This invention is especially adapted to the dispensing of liquid insecticides in grain storage bins, elevators, flour mills, and the like where there are either large or small quantities of stuffs to be treated. It is equally adaptable however to many other fields, such as refrigeration, air-conditioning, textile treatments, water purification, or any other applicable field where it is desired to periodically dispense a measured quantity of liquid. It is not intended, therefore, that the invention be limited in scope with respect to the application thereof, but that it extend to all applications in which the same can be used as defined by the claims hereof.

In connection with the use of the invention for the dispensing of liquid insecticide in the grain industry, other dispensing methods have previously been crude in that measurements were made manually. In the case of noxious or toxic liquids the safety and the health of the workmen were endangered and the clothing of such workmen corroded and rendered useless. The most efficient method of application being the dispensing of fumigants directly upon the grain either while filling bins or afterwards, the operator was necessarily positioned at the top of the bins or in other inaccessible places.

The difficulties and dangers of pouring, measuring, and handling of any liquids, even those which are not noxious, are manifold, but are all eliminated by my invention. My invention is adaptable as well to the dispensing of noxious, volatile, or highly toxic liquids as it is to comparatively easily handled liquids of low volatility. The solution of the difficulties set forth above constitutes another object of my invention.

Another object of the invention is to provide a method and apparatus whereby a single mechanical movement initiates a cycle of dispensing, said cycle then continuing to completion without further mechanical aid.

Still a further object of the invention is to provide an apparatus for practising the method of my invention in which the possibilities of external leakage are entirely eliminated and internal leakage of the apparatus is substantially eliminated.

Another object is to provide a method and apparatus for dispensing measured dosages of liquid which will not be rendered ineffective or even substantially less effective by any occluded foreign particles suspended in the liquid.

Yet a further object is to provide a method and apparatus for dispensing measured dosages of liquids having varying degrees of corrosive characteristics but which will not be negatively affected to any practical degree by any corrosion of the apparatus occasioned by said corrosive liquid.

Still another object is to provide a method and apparatus for applying fumigants to grains and the like which will appreciably increase the efficiency of said fumigants over previous methods and apparatus as measured by the percentage of kill over the efficiency heretofore attainable by other methods and apparatus. An object relating thereto is to provide a method and apparatus which will apply the fumigants to the grain in such manner that more intimate and thorough relationship between fumigant and grain is effected, and evaporation of the fumigant may be substantially minimized by reducing the total grain surface exposed to the air.

Many other objects are inherent in the method and apparatus of my invention as will be apparent as the discussion and description proceed without further enumeration thereof. However, a brief description of my method should aid in the understanding of both the process and apparatus thereof.

The liquid to be dispensed is maintained in a constant pressure storage tank having an expanded surface at the measuring level. The tank is connected with a dispensing chamber the size of which controls the volume of fluid dispensed. The fluid in the dispensing chamber is suddenly displaced simultaneously with the closing of the passage from the storage tank. The surge produced thereby primes a siphon which draws off the liquid in the dispensing chamber. Shortly thereafter the passage from the tank is opened and the dispensing chamber refills after which the cycle is repeated.

I have illustrated in the accompanying drawings a preferred embodiment of the apparatus of my invention together with certain diagrams to which reference will be made in describing the same, from an inspection of which, when considered in connection with the following description, my invention, its mode of practise, and the mode of construction, assembly and operation of the apparatus thereof and many of the advantages inherent therein should be readily understood and appreciated.

Referring to the drawings in which the same characters of reference are employed to indicate corresponding or similar parts throughout the several figures of the drawing:

Fig. 1 is a schematic view of a complete liquid dispensing installation embodying the apparatus of the invention and with which the new method may be practised.

Fig. 2 is a vertical sectional view taken through the storage tank and dispensing portion of an elemental form of the apparatus of my invention.

Fig. 3 is a vertical sectional view of the dispensing portion of Fig. 2 enlarged to show the details thereof.

Fig. 4 is a vertical sectional view taken through a modified form of the dispensing portion of my apparatus.

Fig. 5 is a sectional view taken through the apparatus of Fig. 4 on the line 5—5 and in the direction indicated.

Fig. 6 is a vertical sectional view taken through a further modification of the dispensing portion of my apparatus.

Fig. 7 is a sectional view taken through the apparatus of Fig. 6 on the line 7—7 and in the direction indicated.

Fig. 8 is a longitudinal sectional view taken through a storage tank having a fitting attached thereto whereby air may be admitted while liquid is removed, and having certain improvements over that form of the tank shown in Fig. 2.

Fig. 9 is a vertical sectional view through another form of the fitting of Fig. 8.

Fig. 10 is a vertical sectional view taken through a modified form of the dispensing portion of my apparatus.

Fig. 11 is a view of an apparatus similar to that of Fig. 10 but showing a slight variation therein.

Fig. 12 is a view similar to that of Fig. 8 but showing a type of storage cylinder fitting intended to be attached externally of a cylinder of liquid having an air hole on the end thereof.

My method of dispensing liquid depends upon certain physical principles combined to produce the results described in connection with the object set forth above. I provide a storage tank of liquid which it is desired to dispense, and maintain a constant head of pressure in said tank. The tank is connected with a dispensing chamber having a siphon connected with the bottom thereof. The measuring level of the tank is below the siphoning curve and is expanded so that a large surface is presented to the atmosphere. The level of liquid in the dispensing chamber is that of the measuring level of the storage tank and hence when there is free passage from tank to chamber the dispensing chamber will fill to this level. A surge is imparted to the liquid in the chamber at the same time that the passage from the storage tank is cut off. The surge primes the siphon and the siphon draws off the liquid which was contained in the dispensing chamber. After the liquid from the dispensing chamber has been drawn off the passage from the storage tank is once more opened, the dispensing chamber filled and the apparatus is ready for a repeat cycle.

The elementary forms of my invention are contained in Figs. 1, 2, 3, and 10. The reference character 20 represents a panel carrying a plurality of electrical switches, four in number in the embodiment shown and identified by the numerals 21, 22, 23, and 24. Each switch has a spring arm 25, 26, 27, and 28 respectively, by which the switch is operated. The arms are adapted to normally ride the periphery of a cam wheel 29 which is slotted at 30, the slot having an extension 31. The switches and arms are so arranged that when the cam wheel 29 rotates in a counterclockwise direction as indicated by the arrow, the respective arms will consecutively drop or spring into the slot 30 and climb out on the extension 31 and subsequently reach the periphery of the cam wheel 29. The switches are arranged to close when the arms are in slot 30 or extension 31 and open when the arms are on the periphery of the cam wheel.

The cam wheel 29 is rotated by means of a constant speed synchronous motor the shaft of which is shown at 32. The speed of the motor depends upon the amount of liquid to be dispensed and the size of the elements of the installation. A rotatable switch 33 is positioned on the panel 20 for the control of the switches 21, 22, 23, and 24. The input to the panel is shown as leads 34 which go to the power line, and the output of the panel as shown by leads 35 goes to a solenoid 36 having a movable core 37.

The contacts of the switch 33 are below the panel 20 and hence not shown, but it should be obvious that they are connected to the switches 21, 22, 23 and 24 in any conventional manner so that the desired results are obtained. By various circuit arrangements the switch 33 may enable any desired combination of the cam switches to be capable of becoming closed when the respective arms engage the slot 30. Thus one switch position may render switch 22 operable, a second may render switches 22 and 24 operable, while a third may render all of the cam-switches operable. In this manner the switch 33 controls the number of cycles of operation of the apparatus for each revolution of the cam wheel 29. As any one of the cam switches is closed, as by having its arm drop into the slot 30, the solenoid 36 is energized and the core 37 is pulled downwardly and into the solenoid coil 36. The core 37 remains in the coil 36 while the arm rides up the extension 31 but when the arm rides up on the periphery of the cam wheel 29 the associated switch is opened, breaking the circuit to the solenoid and permitting the core 37 to be withdrawn as will presently be described.

It should be appreciated that the speed of the cam wheel 29 is not very great. In one embodiment of the invention the cam rotated at a rate of about six revolutions per hour. The length of time spent by any of the arms 25, 26, 27, or 28 in the slot 30 and extension 31 is greater than the time required to siphon the volume of liquid contained in the dispensing chamber, while the distance between respective cam switches should be traversed in not less time than required to fill the dispensing chamber from the storage tank by gravity.

The solenoid core 37 is connected to a cable 38 which is fastened at 39 to the inner wheel 40 fixedly secured to an outer wheel 41. The wheels 40 and 41 may be integrally formed. A cable 42 is fixed to the wheel 41 at 43. The opposite end of the cable 42 passes over the periphery of the wheel 44 and is secured thereto at 45. The inner wheel 46 which rotates with the wheel 44 and is secured thereto carries a cable 47 to one end of which is provided a counter-weight 48 and to the other end of which is secured a plunger displacement valve body 49 (see Fig. 2).

When the solenoid core 37 is pulled downwardly upon energization of one of the cam switches, the wheels 40 and 41 rotate in a clockwise direction moving the cable 42 to the left, and rotating wheels 44 and 46 in a clockwise direction. This causes the plunger 49 to suddenly move downwardly pulling the counterweight 48 upwardly. When the solenoid coil 36 is deenergized, the counterweight 48 will pull the left side of the cable 47 downwardly thereby raising the plunger 49.

The plunger 49 moves up and down in a chamber 50 which may be termed the inlet-valve chamber, the cross-section of which is somewhat larger than that of the plunger 49 so that the surface of the liquid in the chamber communicates with the atmosphere. The chamber 50 communicates at its bottom with a measuring chamber 51 by a passageway 52 while the chamber 51 communicates adjacent its bottom with a discharge siphon 53.

The discharge siphon 53 is an ordinary bent tube siphon whose leakage level is determined by the bottom wall of the bend as at 54. This leakage level should be positioned a distance above the normal measuring level of the liquid which is substantially constant throughout the entire system as shown at 55, 56, 57, 58 and 59. The reason therefor will become obvious as the description proceeds.

A displacement member 60 is positioned and affixed in the upper portion of chamber 51 so that its bottom edge 61 is below the measuring level of the liquid and hence immersed therein. This member 60 may be solid or hollow or open or closed at its bottom since communication between the liquid and atmosphere is established through the space surrounding the displacement member between its wall and the wall of the chamber as at 57 and 58.

The plunger 49 is formed with a downwardly projecting central sleeve portion 62 surrounding a valve 63 which may be set therein. A valve seat 64 is provided on the end of inlet post 65 for cooperation with the valve 63. Inlet post 65 serves to guide plunger 49 in its downward descent when it is actuated, and is formed with a hollow central passage 66 through which liquid flows to enter chamber 50. Perforations such as 67 are provided in the sleeve 62 through which the inflowing liquid may enter chamber 50 when valve 63 is open.

In actual operation the plunger 49 is released by the actuating mechanism. Its descent is arrested when valve 63 is seated on valve seat 64 thereby shutting off the inflow of liquid. The sudden displacement of the liquid in chamber 50 by movement of the plunger 49 imparts a surge to the liquid in measuring chamber 51 to prime the siphon 53 whereby the liquid in the siphon is raised from measuring level 59 over leakage level 54. This initiates the siphoning action which continues until all the liquid in chambers 50 and 51 has been drawn off. The plunger valve is then unseated, liquid is admitted and the apparatus is poised for another cycle.

Inlet post 65 is connected by conventional means to a liquid source through a pipe 70. The liquid source comprises a constant pressure storage tank 71 having a pipe 72 leading to a storage supply and regulated by a valve 73; a drainage pipe 73' in the bottom of the tank and regulated by valve 74; the valved outlet pipe 70 leading to the measuring and dispensing apparatus previously described and controlled by valve 75; air relief pipe 76 with a valve 77 and air intake pipe 78. This air intake pipe, in the form of the invention shown in Fig. 2 is inserted through the top of tank 71 and extended downwardly until its bottom outlet end 79 is spaced a predetermined distance above the bottom of the tank. This outlet end 79 of air intake pipe 78 determines the atmospheric pressure measuring level of the liquid throughout the entire system, since communication between atmosphere and liquid in the tank is solely through pipe 78. Thus the measuring levels of the liquid in chambers 50 and 51 and in siphon 53 as at 55, 56, 57, 58 and 59, are all in the same horizontal plane as that of outlet 79 in pipe 78. Of course, as the liquid is dispensed the liquid level in the storage tank varies from the top of the tank to the outlet or measuring level 79 where the effective capacity of the tank is exhausted.

To initiate the dispensing of liquid, the storage tank 71 with drainage valve 74 and outlet valve 75 closed and air relief valve 77 open, is filled by opening supply valve 73 until the liquid level in the storage tank 71 and air intake pipe 78 has risen to the top of the vessel. The supply valve 73 and the relief valve 77 are then closed and the liquid outlet valve 75 is opened. The liquid will then flow by gravity from the storage tank to the measuring and dispensing chambers, thereby slowly lowering the liquid level in the storage tank and rapidly lowering the tank pressure and the liquid level in the air intake pipe until the air is down into the tank at 79, thus establishing atmospheric pressure at this, the measuring level. The withdrawal of liquid from the storage tank will continue until the level of the liquid in the measuring and dispensing chambers has reached the measuring level as determined by outlet 79.

The dispensing cycles above described are initiated and repeated until the effective capacity of the storage tank is exhausted i. e. until the liquid level is lowered to the measuring level as at 79. Then the tank is once more filled as described above and the cycle is again repeated.

From the above description the method of my invention should be apparent, the same comprising a certain sequence of steps by means of which liquid may be dispensed from my apparatus in measured quantities. Basically provision is made for a constant pressure storage vessel, a measuring chamber, and a siphon all connected together and so arranged that the measuring level of the chamber and the dispensing level of the storage vessel are at the same level, both being below the leakage level of the siphon. Displacing a quantity of liquid in the chamber will prime the siphon and initiate a withdrawal of the liquid from the chamber. If the connection between the storage vessel and the measuring chamber is blocked off, only the liquid in the measuring chamber will be dispensed through the siphon. The entrance to the siphon is arranged at the bottom of the vessel so that practically all of the liquid is withdrawn. After withdrawal, the entrance to the chamber from the storage vessel is unblocked and liquid from the storage vessel flows by gravity into the measuring chamber up to the measuring level.

The foregoing description has concerned itself only with the basic or elementary forms of the apparatus for practicing the method of this invention. In actual practice certain modifications of the basic structure may be made without departing from the spirit or scope of the invention. At this point the description of several of these modifications will be set forth.

In Figs. 4-7 inclusive several modifications of the measuring and dispensing part of the apparatus are shown which illustrate how two or more parts such as measuring and dispensing chambers and the siphon may be combined and unitarily constructed.

Figs. 4 and 5 show a modification of the dispenser with the measuring and dispensing chambers combined in a single unit communicating with a concentric tube construction of the siphon. This construction of the siphon is especially desirable because of its superior priming characteristics, and of course the advantages of the unitary measuring and dispensing chambers are obvious. Similar parts are designated by like numerals with an added suffix a.

The chambers are contained in a cylindrical housing 90 comprising a cylinder 91 closed at one end by a bottom plate 92 and at the other by a fitted cover 93. A centrally bored displacement member 60a, whose function is the same as the displacement member 60 in the primary apparatus, is affixed to the cover 93 by a plurality of cooperating bolts such as 94 and 95 and clamps 96 and 97.

Within the central bore of the displacement member 60a, a plunger displacement valve body 49a is freely suspended by a cable 47a which is in turn connected to an actuating mechanism which may be similar to that described above and illustrated in Fig. 1 of the drawings. Any conventional method may be used to affix the free end of cable 47a to the plunger 49a such as a cable clamp 98 affixed to the plunger by means of a bolt 99.

It should be noted that plunger 49a differs somewhat from the elementary plunger 49 in its construction. Thus a central valve cylinder 100 is forced into a cooperating collar 101. The lower portion of the central bore of this collar is of a diameter substantially larger than that of cylinder 100 to afford an annular groove 102. This groove cooperates with a sleeve 103 to guide valve 63a in its downward descent when released by the aforementioned actuating device. It should be noted that sleeve 103 is fixedly positioned to the bottom 92 of the housing rather than to the plunger itself as in the elementary form. Inlet post 65a is affixed centrally in the bottom 92 of housing 90 so that one end of its central fluid passage 66a opens into tank outlet pipe 70a. The other end of inlet post 65a is formed into a valve seat 64a which cooperates with valve 63a to close the inlet in the same manner as that described above in the primary form. Perforations such as 66a, are provided as outlets for the liquid within the sleeve 103 to the main chamber.

A passage 104 connects the concentric tube siphon 105 to the measuring and dispensing chamber 89. This siphon consists of an outer tube 106 closed at both ends by closures 107 and 108 and having a relatively smaller diameter tube 109 inserted through a watertight opening in bottom closure 108 into outer tube 106. The upper open end 110 is spaced a certain distance from the bottom of the top closure 107. A brace 111 may be used to support and fix the siphon 105 to housing 90.

As chamber 89 is filled the liquid from the chamber flows through passage 104 into siphon 105 and fills the space between the inner and outer tubes 109 and 106 respectively until the measuring level 112 is reached. The siphoning action is initiated in the same manner as in the primary modification by the surge resulting from the dropping of the displacement plunger 49a; said surge raising the fluid from the measuring level over the open top 110 of the inner siphoning tube 109 to begin dispensing the liquid.

Figs. 6 and 7 illustrate yet another modification of the dispenser in which the measuring and dispensing chambers are combined with a concentric tube siphon in a single unit.

Again like parts are designated by similar numerals but with the added suffix b.

As in the modification above described a housing 90b of similar construction and having a displacement head 60b secured to its top has a centrally bored plunger displacement body 115 freely suspended within the displacement head 60b by cable 47b. It should be noted that plunger 115 differs materially from the plungers heretofore described. This plunger is of uniform diameter throughout its length and is centrally bored to afford a central passage 116 with a valve 117 formed at the bottom of said plunger. A cooperating valve seat 118 is formed on the upper end of an inlet post 119. Inlet passage 66b is formed eccentrically in post 119 and communicates at its bottom with tank outlet pipe 70b and at its top with measuring chamber 89b.

The concentric tube siphon 105b is positioned at the center of the dispenser. The details of construction are similar to that of the siphon shown in Figs. 4 and 5 with an outer tube 106b closed at its upper end by a closure 107b and having a relatively smaller diameter tube 109b inserted through the bottom member 92b into outer tube 106b. However, it will be noted that the upper portion of the siphon projects upwardly into the central passage 116 of the plunger 115 and is positioned to permit the outer tube 106b to guide the plunger in its ascent and descent. Moreover the inner tube 109b projects downwardly out of the housing 90b through an opening in the center of bottom plate 92b in order that the liquid may be dispensed therethrough. Communication between the siphon 105b and the chamber 89b is accomplished through member 118 which is constructed as shown in Fig. 7 with a bottom passage 120 therethrough.

The method of dispensing in this apparatus does not differ materially from the previously described methods. The liquid flows under gravity into the chamber 89b through pipe 70b and valve 118. After the chamber is filled the actuating mechanism, previously described in connection with the elementary form of the invention, releases the plunger 115 so that it drops to close valve 118 thus shutting off the liquid inlet. The surge occasioned by the displacement of the liquid in chamber 89b is imparted through passage 120 to the liquid in the siphon which is contained in the space between the inner tube 109b and the outer tube 106b. This surge raises the liquid from the measuring level at 121 above the open end 110b of inner tube 109b to prime the siphon.

In the foregoing description and discussion it has been assumed that constant atmospheric conditions prevailed in order that the measuring level throughout the apparatus would remain constant. Naturally, from a practical standpoint, such is not always the case since the barometric pressure and the temperature of the atmosphere is continually changing. These changes in atmospheric conditions affect not only the accuracy of the method and apparatus but also may limit the range of application thereof.

Of course, changes in pressure and temperature may be self compensating or their effect on the method and apparatus may be inconsequential. However, even if the effects are substantial, they may not necessarily be detrimental. Thus an increase in barometric pressure, while it may cause air entrainment through the air intake pipe 78 to the gas phase of the storage tank 71 (Fig. 2), may affect the measuring level in the dispenser only slightly, momentarily and reversibly. On the other hand a decrease in barometric pressure will cause the liquid level in the dispenser and in the storage air intake pipe to rise above the measuring level. Of course, if the rise is not above that necessary to prime the siphon, there will be no appreciable detrimental effect except that there may be an increase in the volume of liquid dispensed. However, the application of the method and apparatus is limited to that decrease in barometric pressure which will not raise the measuring level above that necessary to prime the siphon.

Changes in temperature affect the apparatus similarly to that caused by changes in pressure. Thus rising temperatures increase the vapor pressure of the gas phase in the storage tank which in turn raises the liquid level in the dispenser above that of the measuring level. Hence the same limitations imposed on the apparatus by the decrease in barometric pressure apply in this case also.

Similar to the effect of increasing atmospheric pressure, decreasing temperatures reduce the pressure of the gas phase in the storage tank to cause air entrainment through the air intake pipe with small, momentary and reversible effects upon the measuring level in the dispenser. Thus the application of the method and apparatus is likewise limited in manner similar to the limitations imposed by an increase in barometric pressure.

To increase the range of application of the method and apparatus and to eliminate or at least reduce the aforementioned adverse effects to the method and apparatus occasioned by the various changes in atmospheric conditions, modifications in the structure of the apparatus may be used to practice the method which will not depart from the spirit and scope of this invention. Several of these modifications are illustrated in Figs. 8, 9 and 12 of the drawings and will be presently described.

The modifications shown in the drawings are primarily of the storage tank, the air intake and the liquid outlet members of the apparatus, since it is through these members that the measuring level of the liquid may be controlled and adverse effects thereon compensated.

Obviously the elevation or depression of the measuring level for any given expansion of the gas phase in the storage vessel due to atmospheric changes is dependent upon the area of liquid surface exposed at the measuring level, and their extent are inversely proportional to this area. By referring to Fig. 2, it will be observed that the aforementioned exposed area comprises the sum of the area of the cross section of the air intake pipe 78 in the storage tank 71, the annular exposed areas in the inlet valve chamber 50 and the dispensing chamber 51, and the cross sectional area of the siphon tube 53. Since the total exposed liquid surface area of this basic embodiment is relatively small, the effect of atmospheric variations upon the elevation of the measuring level is proportionately great and the range of application of the apparatus quite limited.

Logically by enlarging one or more of the aforementioned exposed liquid surface areas the adverse effect of atmospheric changes may be minimized. It is upon this premise that the structure of the modifications illustrated in Figs. 8, 9, and 12 are based. It will be noted that only the exposed liquid surface area of the measuring level in the storage tank is enlarged, the reason therefor being that efficient operation of the plunger inlet valve dictates the necessity for keeping the exposed areas in the dispensing portion of the apparatus to a minimum. Furthermore, by minimizing the exposed area in the dispensing portion, the adverse effects of atmospheric changes upon the dispensed volume will be correspondingly minimized.

It is possible to construct numerous modifications which would increase the surface area at the measuring level outside of the dispenser, but of necessity the number illustrated must be limited to those herein shown and hereinafter described.

In Fig. 8 a modified attachable structure 125 which unitarily combines the air intake pipe and liquid outlet pipe is provided. Again similar parts are designated by like numerals but with an added suffix c.

The attachable structure 125 comprises a cylindrically shaped housing 126 which may be fitted within a storage tank 71c. The housing may be unitarily constructed but is composed of an enlarged tubular mid-section 127 positioned within the tank, a relatively smaller diameter tubular section 128 protruding upwardly from section 127, a lower section 129 of like cross-section protruding downwardly without the tank 71c, and a flange 130 through which bolts 131 may be passed to affix the housing to the tank 71c at the bottom thereof.

An air intake pipe 78c fitted with a valve 132 may be inserted from the bottom into the attachable structure 125. The pipe may be coiled in one or more turns within the expanded section 127 of the air intake as at 133 and then extended upwardly so that its end 134 terminated within the constricted section 128 and above the exposed liquid level in the air intake. The coiling of the air intake pipe 78c will prevent entrained liquid from reaching valve 132.

The entire attachable structure 125 is of liquid-tight construction and is affixed to the bottom of tank 71c in liquid-tight relationship. Communication between the intake and the tank proper is accomplished through a series of staggered holes 135 formed in the wall of the expanded section 127 of the structure 125, the upper holes determining the measuring level. In actual practice the upper holes serve as outlets for the air intake release and the lower holes as liquid inlets to a withdrawal pipe 136 leading to the dispenser proper. However when the rate of liquid withdrawal is high the lower holes also assist in releasing the air intake.

This withdrawal or liquid outlet pipe 136 is joined to the lower constricted tube 129 of the structure 125 near its lower end and as shown in the drawing is positioned with its axis at right angles to that of the tube 129. A valve 137 regulates the flow of liquid therethrough.

The entire modification is adapted to being inserted in the tank 71c while it is in an upright position so that the assembled storage may then be inverted to its operating position as shown in the drawing. Valves 137 and 132 are opened in sequence only after the storage has been inverted and the liquid outlet pipe 136 connected to the dispenser proper. Any liquid entrained in the air intake pipe 78c is readily expelled as soon as liquid withdrawal commences.

This form of the invention not only increases the area of the exposed liquid which serves to stabilize the measuring level, but also permits the air intake pipe to be introduced through the bottom and unitarily constructed with the liquid outlet pipe. Moreover the construction is conducive to the settling of occluded foreign particles before the liquid is withdrawn to the dispenser.

Fig. 9 illustrates an embodiment of the attachable air intake and liquid outlet unit above described which is especially suitable for insertion into the threaded opening of an ordinary chemical liquid shipping cylinder. Thus the cylinder itself may be used as the storage tank. Again similar parts are designated by like numerals but with the added suffix d.

In this embodiment the modified attachable structure 125d may comprise two members 140 and 141 respectively which are fastened together in liquid-tight relationship as at 142 by a pair of cooperating bolts 143 and 144 and a gasket 145. The lower outer member 140, which is somewhat similar to the lower member 129 illustrated in Fig. 8, has a centrally bored passage 146 closed at its lower end as at 147 and open at its upper end to connect with the lower end of a continuing passage 148 formed in the upper enclosed member 141. The upper end of passage 148 opens into an enlarged passage 149 formed in the upper end of member 141 and fitted with a top closure 150. The upper member 141 is formed with a tapered screw threaded wall portion 151 near its bottom end to enable the positioning of the assembled structure partially within the cylinder C through the opening usually provided in the bottom (inverted top) of the cylinder.

An air intake pipe 78d is passed through passages 146 and 148 with its upper portion coiled in one or more turns as at 133d in the enlarged passage 149 so that the upper end 134d terminates above the liquid level in the expanded passage 149. The lower end connects with an air inlet passage 152 formed in an air inlet tube 153 which is controlled by a valve (not shown) such as 132 shown in Fig. 8. A liquid withdrawal pipe 136d communicates at its inner end with the liquid passage 146 and is controlled by a valve 137d.

As in the previously described embodiment communication between the intake and the cylinder proper is accomplished through a series of staggered openings 135d formed in the wall of the expanded section 141. The openings in actual practice, function in the same manner as in the previous embodiment.

Referring now to Fig. 10 it will be seen that the same is a practical embodiment of the dispensing apparatus shown in Figs. 4 and 6 for example, but having certain advantages thereover, primarily in that the valve action for cutting off the inlet to the dispensing chamber is accomplished by means of an air lock, thereby eliminating valve leakage. Furthermore, a simple measuring tube has been substituted for the rather ponderous displacement member previously described. Similar parts are identified by the suffix e.

The dispensing chamber 90e is connected to the storage vessel by means of a conduit 70e which is attached to the bottom wall 92e of the cylinder 91e. The interior outlet 66e of said conduit 70e is well above said bottom wall 92e. A siphon is formed of inner and outer tubes 109e and 105e as described in connection with embodiments shown in Figs. 4 and 6, having the plug member 107e at the top of tube 105e. Note that the tube 105e is attached to the top wall 93e of the cylinder 91e and communicates with the interior thereof by way of a sump 160 which, being below the level of the wall 92e, assures maximum drainage of the chamber. The central tube 109e is fixed to the bottom wall of the sump 160 and is arranged in spaced relation to the tube 105e. The sump 160 is provided with a drain 161 having a threaded plug 162 or other suitable closure.

The inlet post 65e is provided at the top thereof with a cylindrical member 163 preferably welded thereto as shown at 164 and having the upper end thereof open at 165 and slightly below the opening 66e. A drainage opening 166 is provided in the member 163, the same being normally closed by means of a needle valve 167 carried by a screw 168 in the wall 92e. Centrally of the chamber 90e there is provided a guide sleeve 169 fixed in the top wall 93e thereof. A bell plunger 170 is adapted to reciprocate within the sleeve 169 and for this purpose is attached to a guide rod 171 riding a bearing 172 formed on the end of the sleeve 169. The rod 171 is hollow and closed off at its bottom end and is carried by the cable 47e by means of a loosely fitting plug 173 attached to the end of the cable. The opening 174 which admits the cable 47e is larger than the cable thickness but retains the plug 173.

The cable 47e is connected to the outer pulley diameter 41e while a solenoid 36e operated in a manner similar to that of Fig. 1 has its core 37e connected by a cable 38e to the inner pulley diameter 40e. The pulley is urged in a counter-clockwise direction by the spring 175. The normal position of the bell plunger 170 is thus at the bottom of its stroke as indicated by the broken lines of Fig. 10. The cycle is initiated by energizing the solenoid through leads 35e, pulling up cable 38e, rotating pulley 40e and 41e clockwise, holding the same in that position for a time, sufficient for the chamber 90e to fill, and then de-energizing the solenoid 36e to permit the spring 175 to rotate the pulleys counter-clockwise, dropping thereby the bell plunger 170.

The upper end wall 93e of cylinder 91e is provided with a measuring or regulator tube 180 carrying an indicator 181 riding on a scale 182 for measuring dosage. The tube 180 is adjustable vertically but must make an airtight connection with cylinder 91e and hence is attached thereto by means of a stuffing box 183.

Presume that the solenoid 36e is energized and the apparatus is in the condition shown in Fig. 10, with the bell plunger 170 at the upper end of its stroke. Note that the measuring level is substantially at the plane of the top wall 93e of the cylinder 91e. The solenoid 36e is now de-energized so that the spring 175 rotates the pulley 40e and 41e in a counter-clockwise direction dropping the plug 193 and consequently causing the bell plunger 170 to drop along its guide 169. The plunger 170 moves downwardly, over the inlet 66e and upon the inlet post 65e. The downward extent of movement of the plunger is determined by the weight thereof because as it moves downwardly, the entrapped air is compressed a slight amount and supports the plunger at a position approximately indicated by the broken lines of Fig. 10, spaced above the bottom wall of the cylindrical vessel 163. It will be seen, that as the bell plunger 170 moved downwardly, it moved into the open end 165 of the vessel 163.

The sudden downward movement of plunger 170 causes a displacement of liquid and consequently a slight surge to occur within the chamber 90e. This surge is communicated to the surface of the liquid contained between the concentrically arranged siphon tubes 105e and 109e thereby priming the siphon and initiating flow of the liquid through tube 109e. This continues until all of the liquid in the chamber 90e has been siphoned off to the level of the open end of tube 105e in the sump 160. During the course of emptying the chamber 90e, the regulator tube is emptied and its bottom end uncovered, giving access from the chamber to the atmosphere. As the level of liquid drops further, the bell plunger settles a slight amount to adjust its center of buoyancy. As the level drops still further past the open end 165 of vessel 163, a quantity of liquid is entrapped in said vessel thereby supporting the bell plunger 170 floating thereon.

When the bell plunger 170 is dropped upon the post 65e it forms an air lock, exerting pressure on the inlet opening 66e. This pressure is greater than the head of liquid between the inlet opening 66e and the measuring level which is at atmospheric pressure, so that liquid cannot flow out of the inlet opening 66e while the bell plunger 170 is in its lowest position.

The action is therefore that of a valve, although the bell plunger 170 never touches either post 65e or vessel 163, nevertheless, the liquid flow is effectively cut off during the entire time that the level of liquid in the chamber 90e is dropping to the bottom thereof.

Presuming now that it is desired to refill the chamber 90e, the solenoid 36e is energized causing the bell plunger 170 to be raised into the sleeve 169. Liquid now flows from the storage tank through conduit 70e, post 65e and into chamber 90e through opening 66e. As the level of liquid in the chamber 90e rises so does the level of liquid entrapped between the walls of the concentric tubes 109e and 105e. The siphon communicates with the atmosphere by way of the center passageway of tube 109e, while the chamber 90e communicates with the atmosphere by way of the regulator or measuring tube 180. When, however, the liquid level passes the lower end of the bell plunger 170, a quantity of air is entrapped therein and its pressure prevents further rise of the liquid therein. Since the difference between the rising level outside of plunger 170 and the mouth of the plunger is so small, the pressure required to keep liquid from rising therein is also very small, and the liquid level within the plunger chamber is practically at the bottom end of the plunger. The liquid continues to rise in the chamber and siphon until the bottom end of the regulator tube 180 is covered. Now the chamber 90e no longer communicates with the atmosphere although regulator tube 180 and siphon tubes 109e and 105e do. The liquid level in the tubes can thus rise to the measuring level, but the air entrapped in the upper end of the chamber 90e resists the influx of more liquid and hence effectively stops the flow substantially at the bottom end of regulator tube 180. The pressure on the entrapped air is only a few inches above atmospheric and even with liquids of high specific gravity this amounts to the order of 300 inches of pressure. The level will therefore rise only a fraction of an inch above the bottom end of the regulator tube.

From the above it should be readily apparent that the position of the regulator tube 180 controls the amount of liquid that can flow into the chamber 90e and that the indicator 181 and scale 182 may be calibrated to measure various quantities of liquid capable of being dispensed.

In Fig. 11, I have eliminated the internal vessel 163 and substituted therefor the sump 163f. In all other respects the device operates in the same manner as that of Fig. 10. Identical parts are designated by the suffix f.

In Fig. 12, I have shown a fitting which may readily be attached to a type of cylinder or storage tank 200 having, besides the conventional outlet 201, a smaller auxiliary opening 202. This is a convenient arrangement to be used with my invention, since I can attach an air tube 203 to opening 202 and thus establish the measuring level at the end 204 thereof. Conduit 205 is fitted into opening 201 and the whole is enclosed by a bell member 206 attached to an annular threaded ring 207 by screws 208 and gasket 209, the entire assembly adapted to be screwed onto the cylinder 200. The bell member is provided with an air inlet valve 210 and liquid outlet valve 211. Operation of this fitting is believed to be obvious in view of previous descriptions.

Attention is now once more directed to Fig. 11. By certain modifications of structure, this measuring vessel may be altered to continually dispense liquid, the flow being cut off periodically. This type of device is especially useful where the quantity of fluid required to be dispensed at one time is greater than the practical volume of the measuring vessel. Thus, if the siphon tubes 109f and 105f are eliminated so that there is merely an outlet at the point 160f, while the bell member 170f is passed above outlet 66f the fluid overflows sump 163f and flows out of the vessel at 160f. This flow is continuous and independent of regulator 180f which is therefore not needed. When sufficient fluid has been dispensed, the bell member 170f is dropped over the post 65f, stopping the flow for any desired length of time. The cycle is then repeated.

It is believed that my invention in all of its phases has been clearly set forth herein, such that the operation and construction of the apparatus and the manner of practicing the method should be readily understood without further description and it should be manifest that the details of the preferred embodiments described are capable of wide variations within the purview of the invention as described in the appended claims.

What I claim and desire to secure by Letters Patent of the United States is:

1. A method for dispensing a predetermined quantity of a fluid through a measuring vessel interconnected with a constant pressure source and a discharge siphon which comprises the steps of connecting the measuring vessel to said constant pressure source permitting the vessel to fill from the source by gravity flow to a level below the priming level of said siphon, then connecting the siphon to the vessel by causing a surge of the liquid in the vessel thereby initiating a siphoning action serving to draw off said liquid, and simultaneously cutting off said source.

2. A method for dispensing a predetermined quantity of a fluid through a measuring vessel having a siphon outlet and said vessel being interconnected with a constant pressure source having an inlet into said vessel, which comprises the steps of connecting the measuring vessel to said constant pressure source uncovering said inlet and permitting the vessel to fill with liquid from the source by gravity flow to a level below the priming level of said siphon and until the surface pressure of the liquid in the vessel is equal to the pressure of said source, then connecting the vessel to the siphon by displacing a quantity of said liquid while covering said inlet thereby causing a surge of the liquid within said chamber to prime said siphon while cutting off said source.

3. A method for dispensing a predetermined quantity of fluid through a measuring vessel having a siphon outlet and said vessel being interconnected with a constant pressure source having an inlet into said vessel, which comprises the steps of connecting the measuring vessel to said constant pressure source uncovering said inlet and permitting the vessel to fill with liquid from the source by gravity flow to a level below the priming level of said siphon and until the surface pressure of the liquid in the vessel is equal to the pressure of said source, then connecting the vessel to the siphon by displacing a quantity of said liquid while covering said inlet thereby causing a surge of the liquid within said chamber to prime said siphon while cutting off said source, said liquid being siphoned off from said vessel with no additional liquid entering, then uncovering said inlet after said vessel is substantially emptied and repeating the cycle.

4. The method for dispensing a predetermined quantity of fluid through a measuring vessel having a siphon outlet and a post inlet which comprises suspending an air locking device over said post, filling said vessel from a constant pressure source by gravity and thereby capturing a quantity of air in said device, lowering said device over said post after said vessel is filled and thereby displacing a quantity of fluid in said vessel, creating a surge and priming said siphon outlet to cause same to draw off said fluid, and simultaneously cutting off said inlet.

5. The method for dispensing a predetermined quantity of fluid through a measuring vessel having a siphon outlet and a post inlet which comprises suspending an air locking device over said post, filling said vessel from a constant pressure source by gravity and thereby capturing a quantity of air in said device, lowering said device over said post after said vessel is filled and thereby displacing a quantity of fluid in said vessel, creating a surge and priming said siphon outlet to cause same to draw off said fluid, and simultaneously cutting off said inlet by applying air pressure from said air lock thereto.

6. The method of dispensing a predetermined quantity of fluid through a measuring vessel having a siphon outlet and an inlet opening which comprises the step of connecting said inlet opening to a constant pressure source, filling said vessel from said constant pressure source through said inlet opening by gravity to a level below the priming level of the siphon, moving a body in the fluid of said vessel and upon said inlet thereby blocking same, said moving of said body causing a surge in the fluid to prime said siphon and draw off substantially all of said liquid.

7. The method for dispensing a predetermined quantity of a fluid through a siphon having an open discharge pipe, said siphon interconnected with a measuring and dispensing vessel having an inlet, which comprises establishing a liquid level below the priming level of the siphon within said vessel and permitting the liquid to fill the vessel to said level, then sealing said inlet while simultaneously priming said siphon.

8. The method for measuring and dispensing a predetermined quantity of a fluid through a measuring vessel having a siphon outlet, said vessel being connected through an inlet post with a constant pressure source, which comprises the steps of first adjusting the volume of said vessel to admit a volume of fluid substantially equal to the volume to be dispensed, permitting said fluid to fill said vessel to a level below the priming level of the siphon and closing said inlet post while simultaneously imparting a surge to the liquid in said vessel to prime said siphon whereby said liquid is dispensed.

9. The method of dispensing a predetermined quantity of a fluid through a measuring vessel interconnected with a constant pressure source, said vessel having an inlet from said source and a siphon outlet, which comprises permitting the vessel to fill from the source to a point just short of the leakage level of the siphon, then entrapping a quantity of air in a bell member and dropping same over said inlet thereby air locking said inlet and causing a surge in the fluid to prime the siphon whereby the liquid in the vessel is drawn off.

10. The method of dispensing a predetermined quantity of a fluid through a measuring vessel interconnected with a constant pressure source and having an inlet and a siphon outlet which comprises permitting the flow of fluid through said vessel, and periodically entrapping a quantity of air and subjecting said inlet to said entrapped air by means of an air locking member thereby cutting off said flow.

11. A device for dispensing a predetermined quantity of fluid comprising a constant pressure source, a measuring vessel having fluid connection therewith and having an open discharge pipe siphon therein, the position of the constant pressure source with relation to said measuring vessel being such that the highest level to which said vessel will fill by gravity flow is below the priming level of said vessel and means for simultaneously disconnecting said source and priming said siphon.

12. A device for dispensing a predetermined quantity of fluid comprising a constant pressure source, a measuring vessel having fluid connection therewith and having an open discharge pipe siphon therein the position of the constant pressure source with relation to said measuring vessel being such that the highest level to which said vessel will fill by gravity flow is below the priming level of said siphon, and means for simultaneously disconnecting said source and priming said siphon, said means comprising a member movable to displace fluid in said vessel and block said connection.

13. A device for dispensing a predetermined quantity of fluid comprising a constant pressure source, a measuring vessel having fluid connection therewith and having an open discharge pipe siphon therein the position of the constant pressure source with relation to said measuring vessel being such that the highest level to which said vessel will fill by gravity flow is below the priming level of said siphon, means for simultaneously disconnecting said source and priming said siphon, said connection including an inlet, the said means including a member movable to cooperate with said inlet as a valve to discontinue said fluid connection.

14. A device for dispensing a predetermined quantity of fluid comprising a constant pressure source, a measuring vessel having fluid connection therewith and having an open discharge pipe siphon therein the position of the constant pressure source with relation to said measuring vessel being such that the highest level to which said vessel will fill by gravity flow is below the priming level of said siphon, means for simultaneously disconnecting said source and priming said siphon, said connection including an inlet having a valve seat, and said means comprising a member having a valve for cooperating with said seat to discontinue said connection.

15. A device for dispensing a predetermined quantity of fluid comprising a constant pressure source, an inlet-valve chamber communicating with a measuring chamber having a displacement member arranged in the upper portion thereof and having a siphon outlet, an inlet post fluidly connecting said inlet-valve chamber with said constant pressure source, a valve body movably suspended within said inlet-valve chamber and adapted to drop until said inlet is closed and to simultaneously displace fluid in said chamber so that a surge is imparted to fluid contained in said measuring chamber for priming said siphon.

16. A device for dispensing a predetermined quantity of fluid comprising a constant pressure source, a measuring chamber having a centrally bored displacement member arranged in the upper portion thereof, an inlet post fluidly connecting said chamber with said source, a concentric tube siphon communicating with said chamber, a valve body movably suspended within the central bore of said displacement member and adapted to drop until said inlet is closed and to simultaneously displace fluid in said chamber so that a surge is imparted to fluid within said siphon for priming the same.

17. A device for dispensing a predetermined quantity of fluid comprising a constant pressure source, a measuring chamber having a centrally bored displacement member arranged in the upper portion thereof, an inlet post fluidly connecting said chamber with said source, a concentric tube siphon centrally positioned and partially within said chamber, a centrally bored plunger displacement valve body movably suspended within the central bore of said displacement member and slidingly surrounding the upper portion of said siphon, said valve body adapted to drop vertically until said inlet is closed to simultaneously displace fluid in said chamber so that a surge is imparted to fluid within said siphon for priming the same.

18. A device for dispensing a predetermined quantity of fluid comprising a constant pressure source, a measuring chamber having an inlet post fluidly connecting said chamber with source, an adjustable measuring tube for varying the volume of fluid within said chamber, a concentric tube siphon arranged within said chamber, an air-lock seat connected to the upper portion of said inlet post, a bell plunger slidingly suspended within a guide sleeve affixed to the top of said chamber, said plunger adapted to drop within said sleeve down over said post but within said seat until air entrapped within said plunger seals said inlet and floatingly supports said plunger within said seat, said bell simultaneously displacing the fluid within said chamber so that a surge is imparted to fluid within said siphon thereby priming the same.

19. Means for controlling the flow of liquid from a constant pressure source which comprises a vessel having an inlet and outlet, an auxiliary open-ended vessel disposed in said vessel and surrounding said inlet, a bell movable to a position over said inlet and into said auxiliary vessel, said bell movable to entrap a quantity of air while being moved so that when in its final position over said inlet the pressure of the entrapped air will be exerted upon said inlet thereby halting the flow of liquid from said source.

20. A method for dispensing a predetermined quantity of fluid through a measuring vessel having a siphon outlet and having an inlet connected with a constant pressure source so positioned that the maximum level to which said vessel can be filled by gravity flow from said source is below the priming level for said siphon, which comprises the steps of uncovering said inlet and permitting said vessel to fill with liquid to said maximum level, then maintaining the measuring vessel in a filled condition for a period of time greater than zero, then displacing a quantity of said liquid while covering said inlet, said displacement causing a surge of the liquid within said vessel, priming siphon while cutting off said source, siphoning off the liquid from said vessel while simultaneously preventing the admission of additional liquid, then maintaining said measuring vessel in a discharged condition for a period of time greater than zero, then uncovering said inlet and repeating the cycle.

21. A device for dispensing a predetermined quantity of fluid comprising a constant pressure source, a measuring vessel having a fluid inlet connection therewith and having an open discharge pipe siphon therein, the position of said constant pressure source with relation to said measuring vessel being such that the highest level to which said vessel will fill by gravity flow is below the priming level of said siphon and means for simultaneously disconnecting said source and priming said siphon, said means comprising an air locking member movable to air block said inlet connection.

HANS V. HANSEN.

REFERENCES CITED

The following references are of record in the file of this patent:

UNITED STATES PATENTS

| Number | Name | Date |
|---|---|---|
| 81,408 | Riggs | Aug. 25, 1868 |
| 173,167 | Griswold | Feb. 8, 1876 |
| 785,224 | Lowry | Mar. 21, 1905 |
| 872,359 | Lowry | Dec. 3, 1907 |
| 1,030,378 | Beckwith | June 25, 1912 |
| 1,088,566 | Gregory | Feb. 24, 1914 |
| 1,901,785 | Swindin | Mar. 14, 1933 |
| 2,131,329 | Moore | Sept. 27, 1938 |